(12) United States Patent
Guerini

(10) Patent No.: US 8,422,171 B1
(45) Date of Patent: Apr. 16, 2013

(54) DISK DRIVE HEAD STACK ASSEMBLY HAVING A LAMINAR FLEXIBLE PRINTED CIRCUIT WITH A CONDUCTIVE BUMP EXTENDING TO A SECOND CONDUCTIVE LAYER

(75) Inventor: Albert J. Guerini, Gilroy, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/405,038

(22) Filed: Feb. 24, 2012

(51) Int. Cl.
*G11B 5/48* (2006.01)

(52) U.S. Cl.
USPC ...................................... 360/244.1

(58) Field of Classification Search ........... 360/264.2, 360/265.7, 266.3, 244.1, 244.5, 245.8, 245.9
See application file for complete search history.

(56) References Cited

U.S. PATENT DOCUMENTS

| | | | | |
|---|---|---|---|---|
| 5,838,519 A * | 11/1998 | Takizawa et al. | .......... | 360/245.9 |
| 6,023,029 A | 2/2000 | Armezzani et al. | | |
| 6,266,213 B1 * | 7/2001 | Hiraoka | .......... | 360/244.1 |
| 6,369,985 B1 * | 4/2002 | Gouo et al. | .......... | 360/244.1 |
| 6,452,116 B2 | 9/2002 | Armezzani et al. | | |
| 6,549,373 B1 * | 4/2003 | Shiraishi et al. | .......... | 360/244.1 |
| 6,583,962 B2 * | 6/2003 | Ohwe et al. | ........... | 360/244.1 |
| 6,714,383 B2 * | 3/2004 | Kado et al. | ........... | 360/244.1 |
| 6,728,071 B2 * | 4/2004 | Shimizu | .......... | 360/244.1 |
| 7,130,155 B2 * | 10/2006 | Katsumata | .......... | 360/244.1 |
| 7,851,900 B2 | 12/2010 | Ohsaka et al. | | |
| 8,194,356 B2 * | 6/2012 | Nagaoka et al. | .......... | 360/264.4 |
| 8,325,446 B1 * | 12/2012 | Liu et al. | .......... | 360/245.9 |
| 2005/0006749 A1 | 1/2005 | Shimoishizaka et al. | | |
| 2009/0267217 A1 | 10/2009 | Kuwabara | | |

OTHER PUBLICATIONS

Minco, "Flex Circuits Design Guide", 2007, 32 pages.

* cited by examiner

*Primary Examiner* — Angel A. Castro

(57) ABSTRACT

A disk drive head stack assembly includes a laminar flexible printed circuit (FPC) having first and second conductive layers, with a dielectric layer between. An integrated circuit (IC) chip is mounted to the laminar FPC. The IC chip may have a first plurality of terminals closer to the first conductive layer than to the second conductive layer, and second plurality of terminals that is offset towards the second conductive layer relative to the first plurality of terminals. First and second pluralities of conductive bumps contact and connect conductive traces of the first and second conductive layers to the first and second plurality of terminals, respectively. An average height of the second plurality of conductive bumps may be greater than that of the first plurality of conductive bumps. The second plurality of conductive bumps is aligned with and passes through a plurality of openings through the dielectric layer.

28 Claims, 6 Drawing Sheets

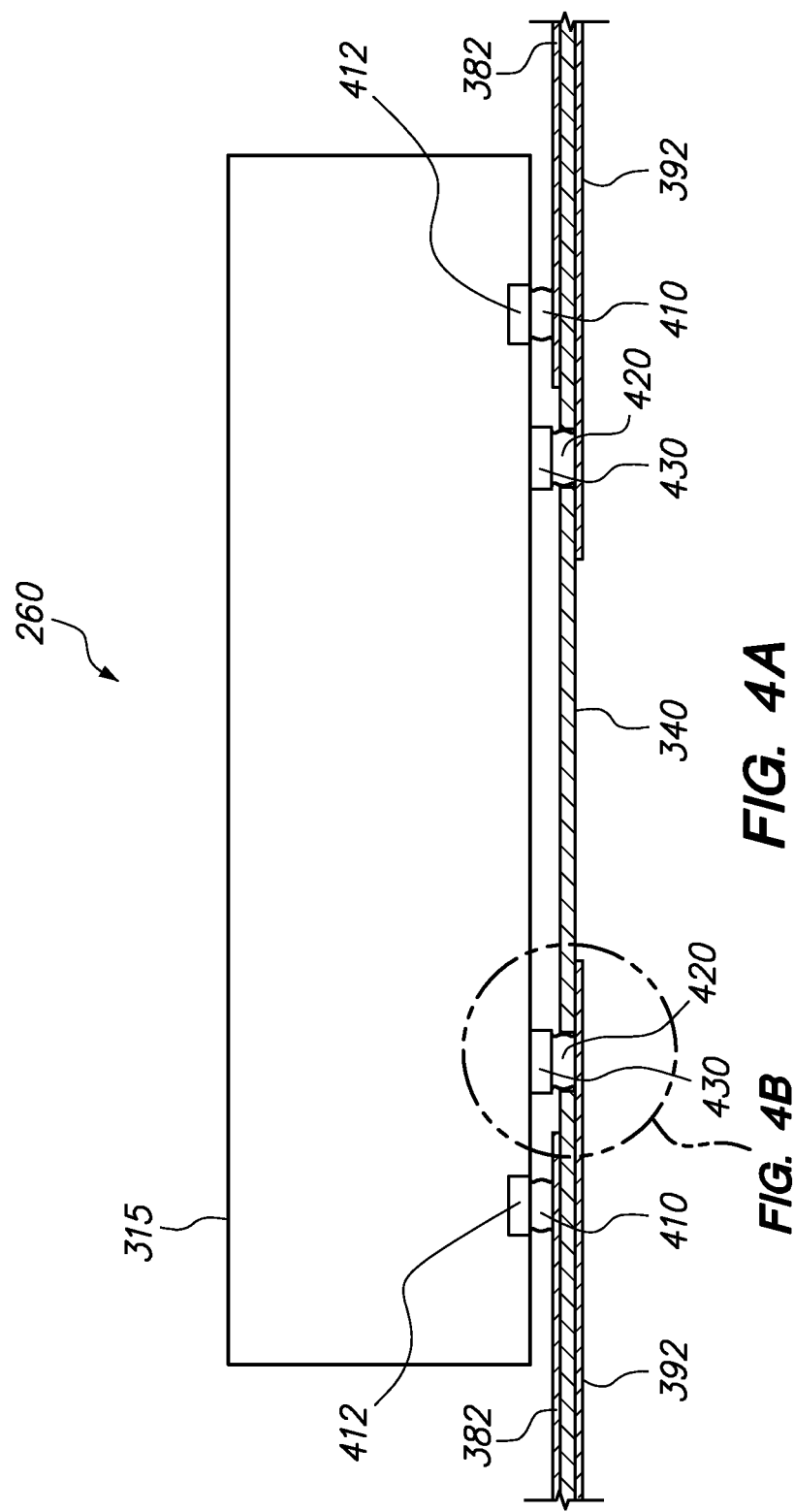

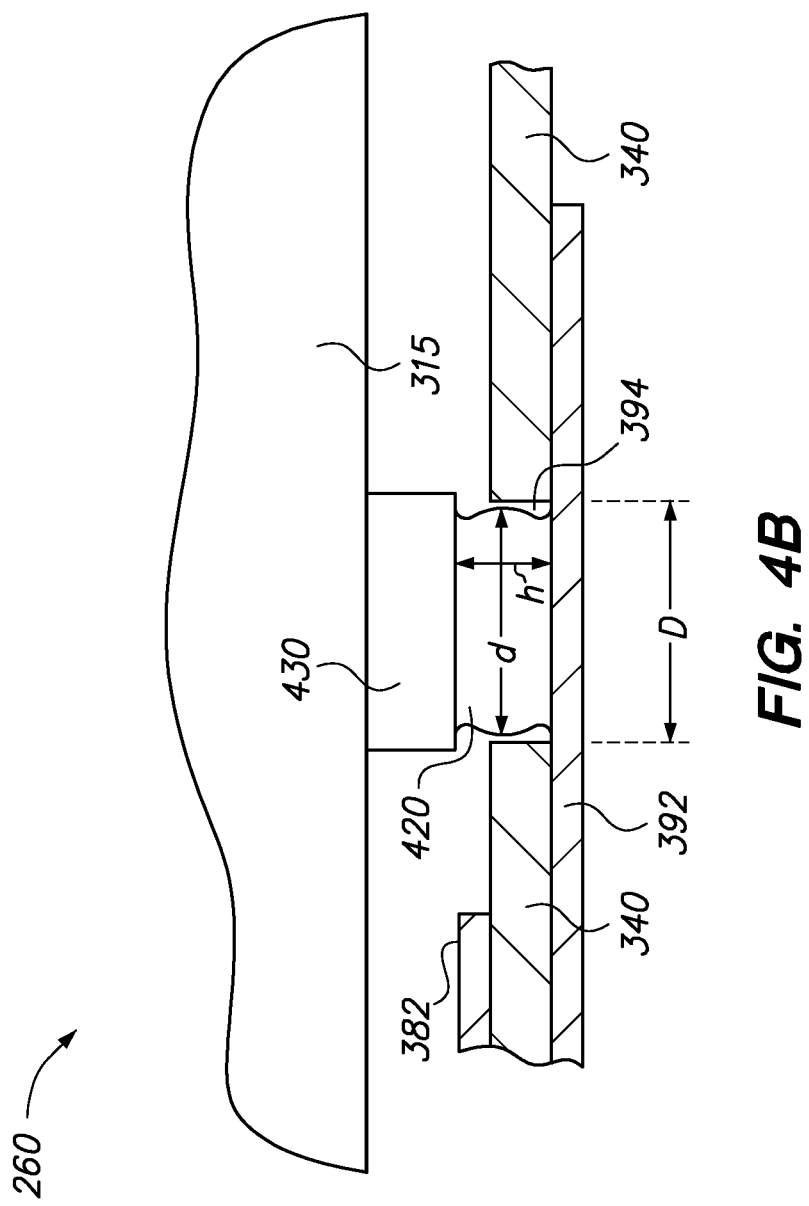

DISK DRIVE HEAD STACK ASSEMBLY
HAVING A LAMINAR FLEXIBLE PRINTED
CIRCUIT WITH A CONDUCTIVE BUMP
EXTENDING TO A SECOND CONDUCTIVE
LAYER

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head gimbal assembly (HGA) that typically includes a suspension assembly with a flexure to carry the electrical signals to and from the head. The HGA, in turn, is a sub-component of a head stack assembly (HSA) that typically includes a plurality of HGAs, an actuator, and a laminar flexible printed circuit. The plurality of HGAs are attached to various arms of the actuator, and each of the flexures of the HGAs has a flexure tail that is electrically connected to the HSA's laminated flexible printed circuit (FPC).

Modern FPCs typically include conductive traces on a dielectric and flexible structural layer. The FPC may be reinforced by a stiffener (e.g. aluminum FPC stiffener) where the FPC is attached to the actuator body, to provide more structural rigidity to the FPC in that region. An integrated circuit (IC) chip (e.g. preamplifier chip) is typically also mounted on the FPC in that region.

The maximum width of the modern FPC is typically limited, for example by the height of the disk drive into which the FPC will be assembled. However, the number of required conductive traces on the FPC is generally increasing, since the number of conductive paths to each HGA has increased to enable additional structures in and functions of the modern HGA. For example, modern HGAs typically include both a read and write transducer, and may also include a microactuator, a heater, a touch-down detector, and/or a laser device to locally heat an adjacent disk medium. Hence, there is a need in the information storage device art for an improved FPC design that can accommodate a greater number of electrical traces with connections to a mounted IC chip.

BRIEF DESCRIPTION OF DRAWINGS

FIG. 4A is a side cross sectional view of a FPC according to an embodiment of the present invention.

FIG. 4B is an expanded view of a designated portion of the FPC of FIG. 4A.

DETAILED DESCRIPTION OF EXAMPLE EMBODIMENTS

Figure 1:
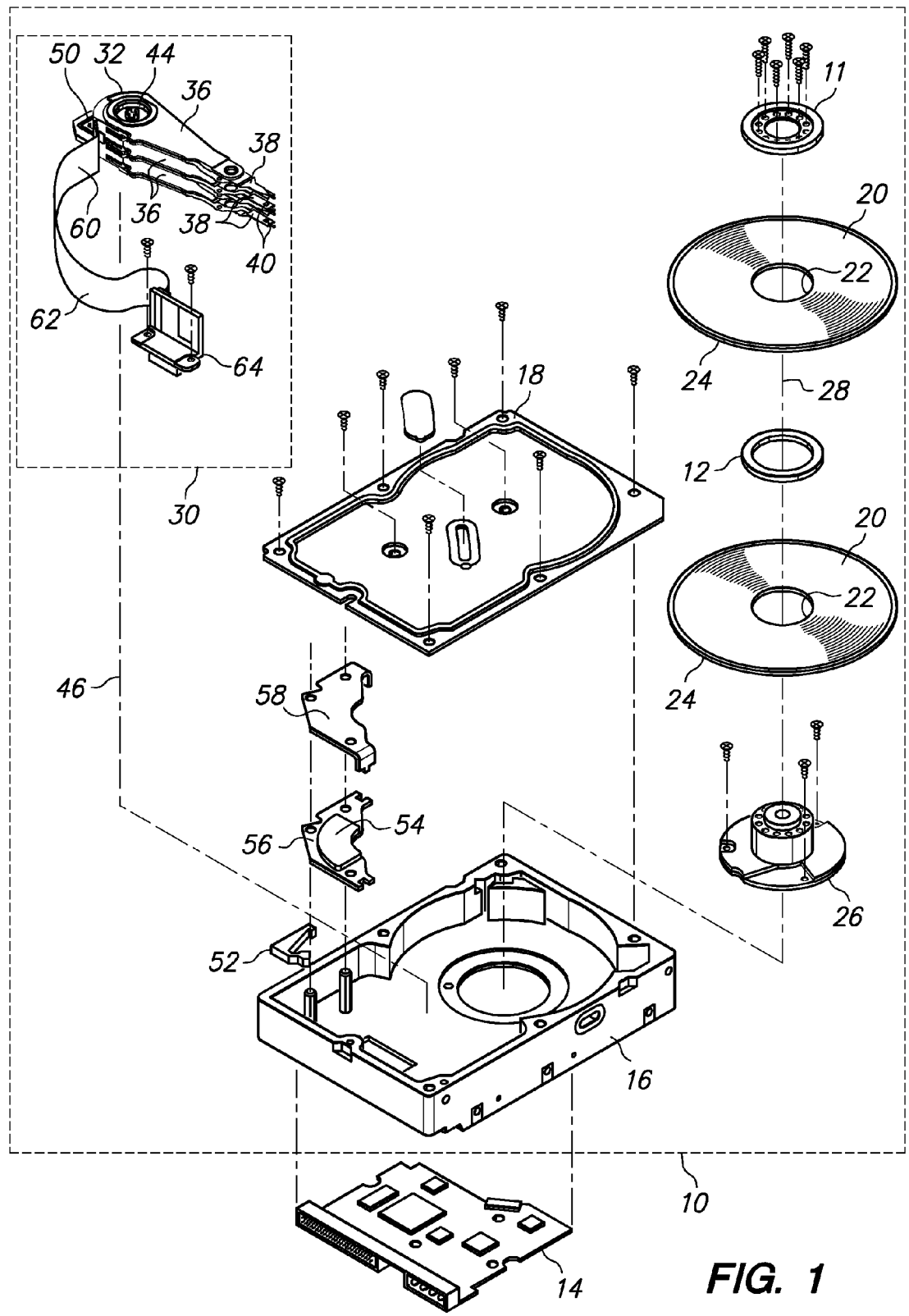
FIG. 1 is an exploded view of a disk drive capable of including an embodiment of the present invention.

FIG. 1 is an exploded perspective view of a disk drive according to an example embodiment of the present invention. The disk drive includes a head disk assembly (HDA) 10 and a printed circuit board assembly (PCBA) 14. The HDA 10 includes a base 16 and cover 18 that together house at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. In certain embodiments, the head disk assembly 10 further includes a spindle motor 26 for rotating the disk 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

In certain embodiments, the HDA 10 further includes a head stack assembly (HSA) 30 rotatably attached to the base 16 of HDA 10. The HSA 30 includes an actuator comprising an actuator body 32 and one or more actuator arms 36 extending from the actuator body 32. The actuator body 32 includes a bore 44 and a pivot bearing cartridge engaged within the bore for facilitating the HSA 30 to rotate relative to HDA 10 about actuator pivot axis 46. One or two head gimbal assemblies (HGA) 38 are attached to a distal end of each actuator arm 36. In certain embodiments, each HGA 38 includes a head (e.g. head 40) for reading and writing data from and to the disk 20, and a load beam to compliantly preload the head against the disk 20. The HSA 30 further includes a coil support that extends from one side of the HSA 30 that is opposite head 40. The coil support is configured to support a coil 50 through which a controlled electrical current is passed. The coil 50 interacts with one or more magnets 54 that are attached to base 16 via a yoke structure 56, 58 to form a voice coil motor for controllably rotating the HSA 30. HDA 10 includes a latch 52 rotatably mounted on base 16 to prevent undesired rotations of HSA 30.

In certain embodiments, the PCBA 14 includes a servo control system for generating servo control signals to control the current through the coil 50 and thereby position the HSA 30 relative to tracks disposed upon surfaces of disk 20. In certain embodiments, the HSA 30 is electrically connected to PCBA 14 via a flexible printed circuit (FPC) 60, which includes a flex cable 62 and a flex cable support bracket 64. The flex cable 62 supplies current to the coil 50 and carries signals between the HSA 30 and the PCBA 14.

In the magnetic hard disk drive of FIG. 1, the head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
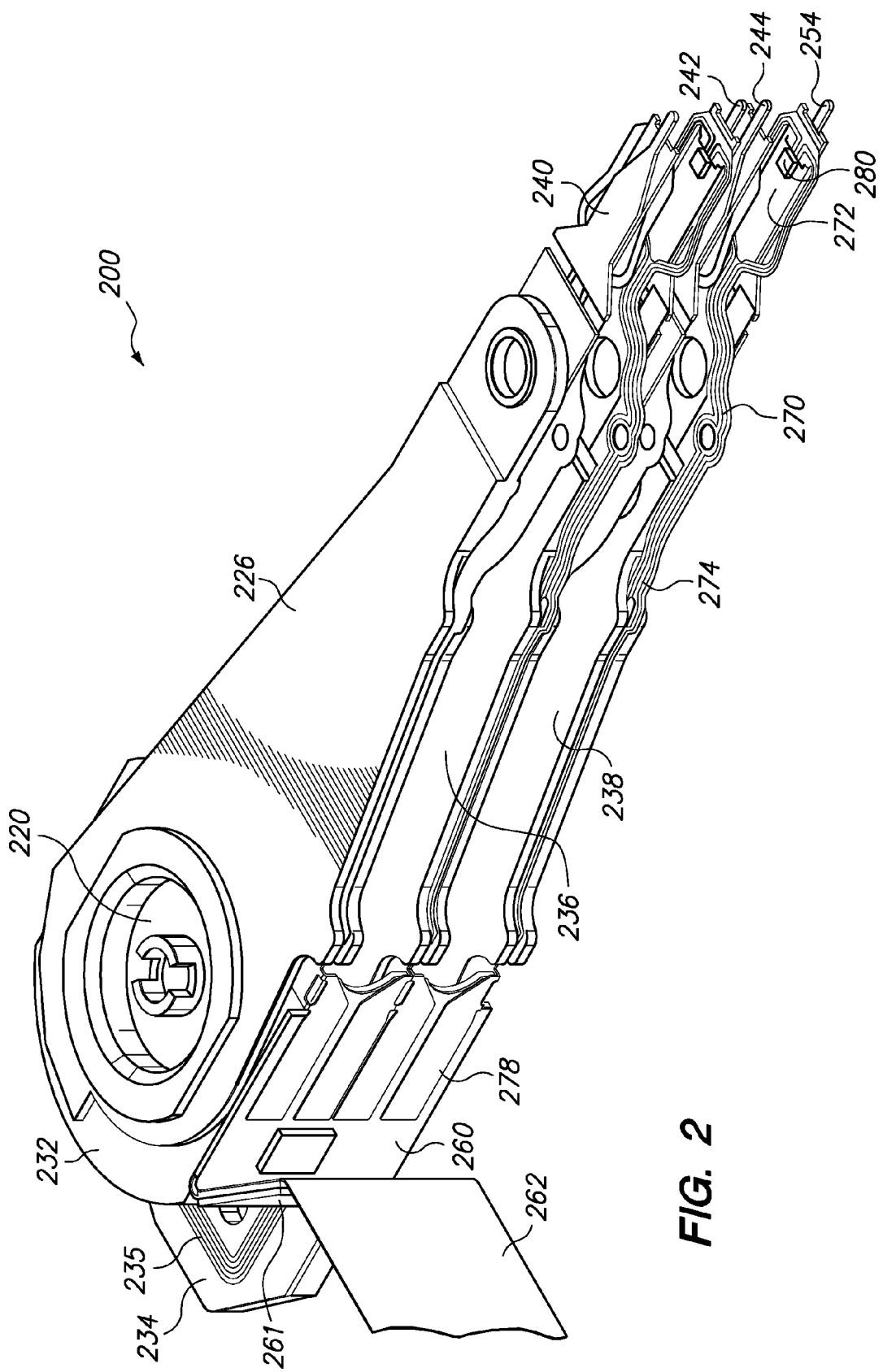
FIG. 2 depicts a head stack assembly capable of including an embodiment of the present invention.

FIG. 2 is a perspective view of a head stack assembly (HSA) 200 according to an example embodiment of the present invention. The HSA 200 includes an actuator body 232 and a plurality of actuator arms 226, 236, 238 extending from the actuator body 232. The actuator body 232 may comprise aluminum, for example. The actuator body 232 may include a pivot bearing cartridge 220 disposed in the actuator bore, and a coil support 234 that supports a coil 235 and extends from the actuator body 232 in a direction that is generally opposite the actuator arms 226, 236, 238.

In the embodiment of FIG. 2, the HSA 200 also includes a plurality of head gimbal assemblies (HGA) 240, 242, 244, 254, attached to the actuator arms 226, 236, 238. For example, such attachment may be made by swaging. Note that the inner actuator arm 236 includes two HGAs, while each of the outer actuator arms 226, 238, includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, possibly replaced by a dummy mass.

In certain embodiments, each HGA includes a head for reading and/or writing to an adjacent disk surface (e.g. HGA 254 includes head 280). The head 280 is attached to a tongue portion 272 of a laminated flexure 270. The laminated flexure 270 is part of the HGA 254, and is attached to a load beam subcomponent of the HGA 254. The laminated flexure 270 may include a structural layer (e.g. stainless steel), a dielectric layer (e.g. polymide), and a conductive layer into which traces are patterned (e.g. copper).

In the embodiment of FIG. 2, the HSA 200 also includes a laminar flexible printed circuit (FPC) 260 adjacent the actuator body 232, and the FPC 260 includes a flex cable 262. The FPC 260 may comprise a laminate that includes two or more conventional dielectric and conductive layer materials (e.g. one or more polymeric materials, copper, etc). The laminar FPC 260 may include a metallic stiffener 261 (e.g. aluminum). The laminated flexure 270 includes a flexure tail 274 that includes a terminal region 278 that is electrically connected to bond pads of the FPC 260.

Methods of electrical connection of the flexure tails to the FPC 260 include ultrasonic bonding of gold coatings thereon, solder reflow, solder ball jet (SBJ), and anisotropic conductive film (ACF) bonding, and are preferably but not necessarily automated. In certain embodiments, to electrically connect and securely attach the flexure tails to the FPC 260, the flexure tails are first aligned with the FPC 260, and then pressed against the FPC 260 (at least temporarily) while electrical connection is established and secure attachment is completed.

Figure 3:
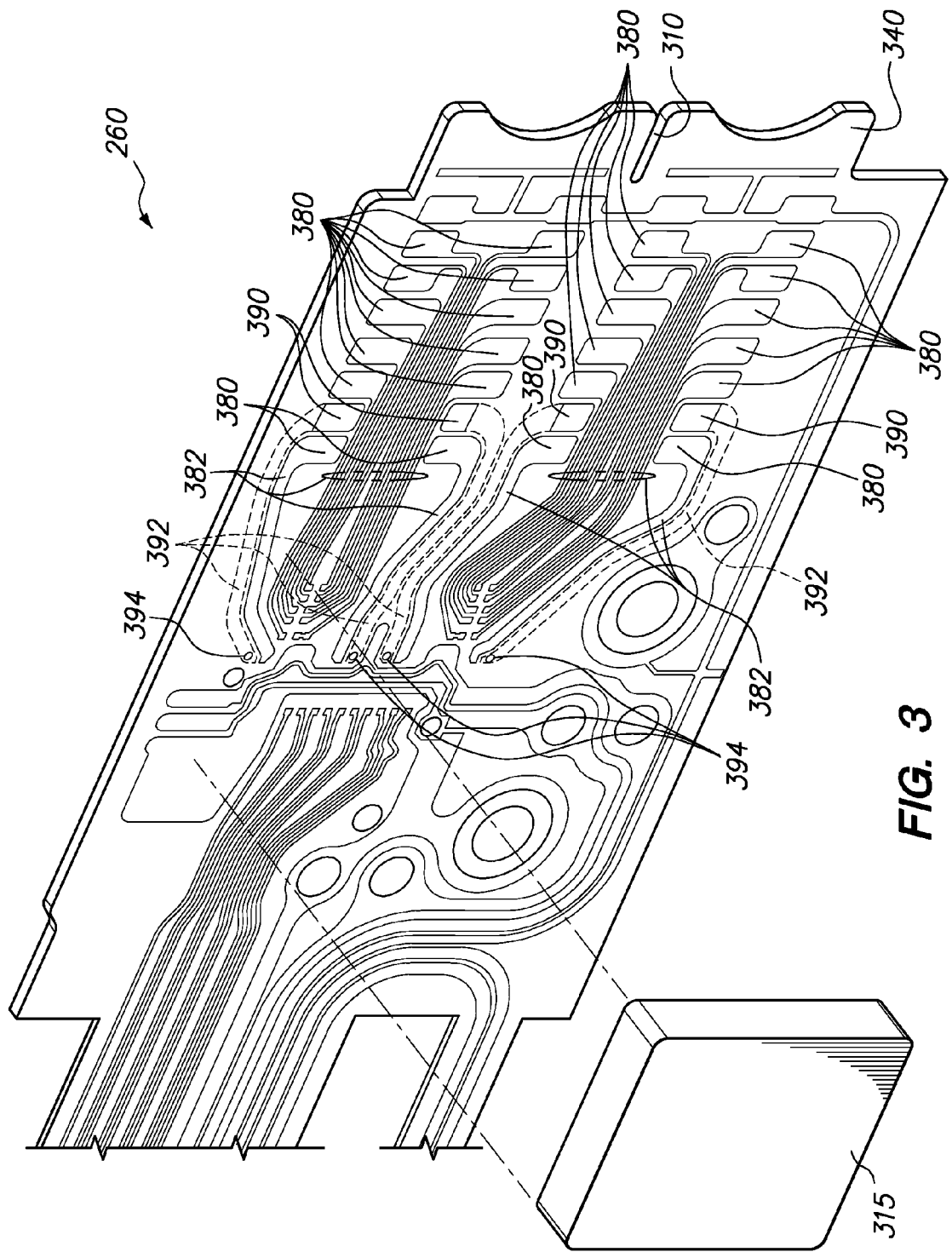
FIG. 3 is perspective view of a flexible printed circuit (FPC) according to an embodiment of the present invention.

FIG. 3 is a perspective view of a portion of a laminar flexible printed circuit (FPC) 260 according to an embodiment of the present invention, before flexure tail terminal regions (e.g. the flexure tail terminal region 278 shown in FIG. 2) are bonded thereto. The laminar FPC 260 includes a dielectric layer 340, and a first conductive layer that includes a first plurality of conductive traces 382 disposed on the side of the dielectric layer 340 facing the viewer in FIG. 3 (hereinafter the "front" side of the dielectric layer 340). The laminar FPC 260 also includes a second conductive layer that includes a second plurality of conductive traces 392 disposed on the side of the dielectric layer 340 that faces away from the viewer in FIG. 3 (hereinafter the "back" side of the dielectric layer 340). The first and second conductive layers, and hence the first and second pluralities of conductive traces 382, 392, may comprise copper, for example.

Since the second plurality of conductive traces 392 is disposed on the back side of the dielectric layer 340, the traces 392 would normally not be visible from the viewpoint of FIG. 3. However, the traces 392 are shown in FIG. 3 using phantom lines even though the dielectric layer 340 is disposed between the first conductive layer (and corresponding conductive traces 382) and the second conductive layer (and corresponding conductive traces 392). FIG. 3 also shows that the dielectric layer may include a plurality of openings 394 through the dielectric layer 340, to provide some access for electrical connection to the conductive traces 392 from the front side of the dielectric layer 340.

Note that in the embodiment of FIG. 3 the conductive traces 392 on the back side of the dielectric layer 340 follow paths that do not overlap or cross-over any of the conductive traces 382 on the front side. Such placement of the conductive traces 392 has been done in FIG. 3 only for clarity; the drawing would have a cluttered appearance otherwise which might lead to ambiguity in numerical labeling. However, it is contemplated (and in many embodiments both practical and desirable) that the paths of the conductive traces 392 on the back side of the dielectric layer 340 are not constrained by the paths of the conductive traces 382 on the front side. Rather, the paths of the conductive traces 392 on the back side of the dielectric layer 340 may overlap or cross over the paths of the conductive traces 382 on the front side, with the dielectric layer 340 preventing undesirable short circuits that would otherwise occur if the conductive traces 382 and 392 were all disposed on the same side of the dielectric layer 340.

In the embodiment of FIG. 3, each of the electrically conductive FPC traces 382, 392 has a distal portion that terminates at a respective one of a plurality of electrically conductive FPC bond pads 380, 390. The electrically conductive FPC traces 382, 392 may comprise copper for example, and the FPC bond pads 380, 390 may comprise copper with a gold coating, for example. The electrically conductive FPC bond pads 380, 390 are intended to be aligned with and connected to flexure bond pads of the terminal regions of HGA flexure tails (e.g. flexure tail terminal region 278 shown in FIG. 2). Two of the HGA flexure tails may pass through the FPC slit 310 to help facilitate their support and alignment.

In the embodiment of FIG. 3, some of the electrically conductive FPC traces 382 may be wider than others of the electrically conductive FPC traces 382, for example to match a lower desired electrical impedance. For example, in certain embodiments, those FPC traces 382 that connect through to an inductive write element of a read/write head, may be wider than those that connect through to a magnetoresistive read element (e.g. a tunneling magnetoresistive read element) of the read/write head.

In the embodiment of FIG. 3, an integrated circuit (IC) chip 315 (e.g. a pre-amplifier chip) is mounted to the laminar FPC 260, but is shown exploded from the laminar FPC 260 in the view of FIG. 3. Now referring to FIG. 4A, the IC chip 315 includes a first plurality of terminals 412 and a second plurality of terminals 430. The first plurality of terminals 412 are disposed closer to the first conductive layer (i.e. trace 382) than to the second conductive layer (i.e. trace 392). The second plurality of terminals 430 may be offset towards the second conductive layer (i.e. towards trace 392) relative to the first plurality of terminals 412. In certain embodiments such an offset may allow the FPC 260 to accommodate a greater number of electrical traces with connections to the mounted IC chip 315.

In the embodiment of FIG. 4A, a first plurality of conductive bumps 410 contacts and connects the first plurality of conductive traces (e.g. trace 382) to the first plurality of terminals 412. A second plurality of conductive bumps 420 contacts and connects the second plurality of conductive traces (e.g. trace 392) to the second plurality of terminals 430. The conductive bumps 410 and 420 may comprise tin solder, or may be gold balls, for example.

FIG. 4B is an expanded view of the portion of the laminar FPC 260 within the dashed circle shown in FIG. 4A. As can be seen from a comparison of FIG. 3 and FIGS. 4A and 4B, the second plurality of conductive bumps 420 may be aligned with and pass through the plurality of openings 394 through the dielectric layer 340. That is, the second plurality of conductive bumps 420 may pass through the plurality of openings 394 through the dielectric layer 340, if the average diameter D of the openings 394 (as shown in FIG. 4B) is greater than the average diameter d of the conductive bumps 420. For example, in certain embodiments, the average diameter D of the openings 394 may preferably be in the range 80 microns to 150 microns. Note: As used herein, non-circular openings and non-spherical bumps may still be characterized by an "average diameter," and quantifying such an average diameter does not imply a circular or spherical shape.

In the embodiment of FIGS. 4A and 4B, the second plurality of terminals 430 has been vertically offset towards the second conductive layer (i.e. towards trace 392) relative to the first plurality of terminals 412 by an offset distance (measured normal to the dielectric layer 340) equal to the first conductive layer thickness (i.e. thickness of the trace 382) plus the thickness of the dielectric layer 340. Such equality, as depicted in FIGS. 4A and 4B, may simplify manufacture by rendering the height h of conductive bumps 420 to be approximately equal to the height of the conductive bumps 410. However, other offset distances may be used (in which case the bump heights may be unequal).

In certain embodiments, the second plurality of terminals 430 may be offset towards the second conductive layer (i.e. towards trace 392) relative to the first plurality of terminals 412 by an offset distance (measured normal to the dielectric layer 340) in the range 20 to 50 microns. In certain embodiments such an offset range may allow the FPC 260 to accommodate a greater number of electrical traces with connections to the mounted IC chip 315.

Now referring again to FIG. 3, the FPC 260 may optionally include an insulative FPC cover layer over the FPC traces 382 and having windows exposing the regions where the flexure tail terminal regions and the IC chip 315 are bonded thereto. In FIG. 3, the FPC 260 is shown with the FPC cover layer transparent, to better depict underlying FPC conductive traces 382. Note that such an optional insulative FPC cover layer is not the same thing as the dielectric layer 340, since the dielectric layer 340 is disposed between the first conductive layer (and corresponding conductive traces 382) and the second conductive layer (and corresponding conductive traces 392), whereas the optional insulative FPC cover layer is disposed over the conductive traces 382 and so not between the first and second conductive layers.

Figure 5:
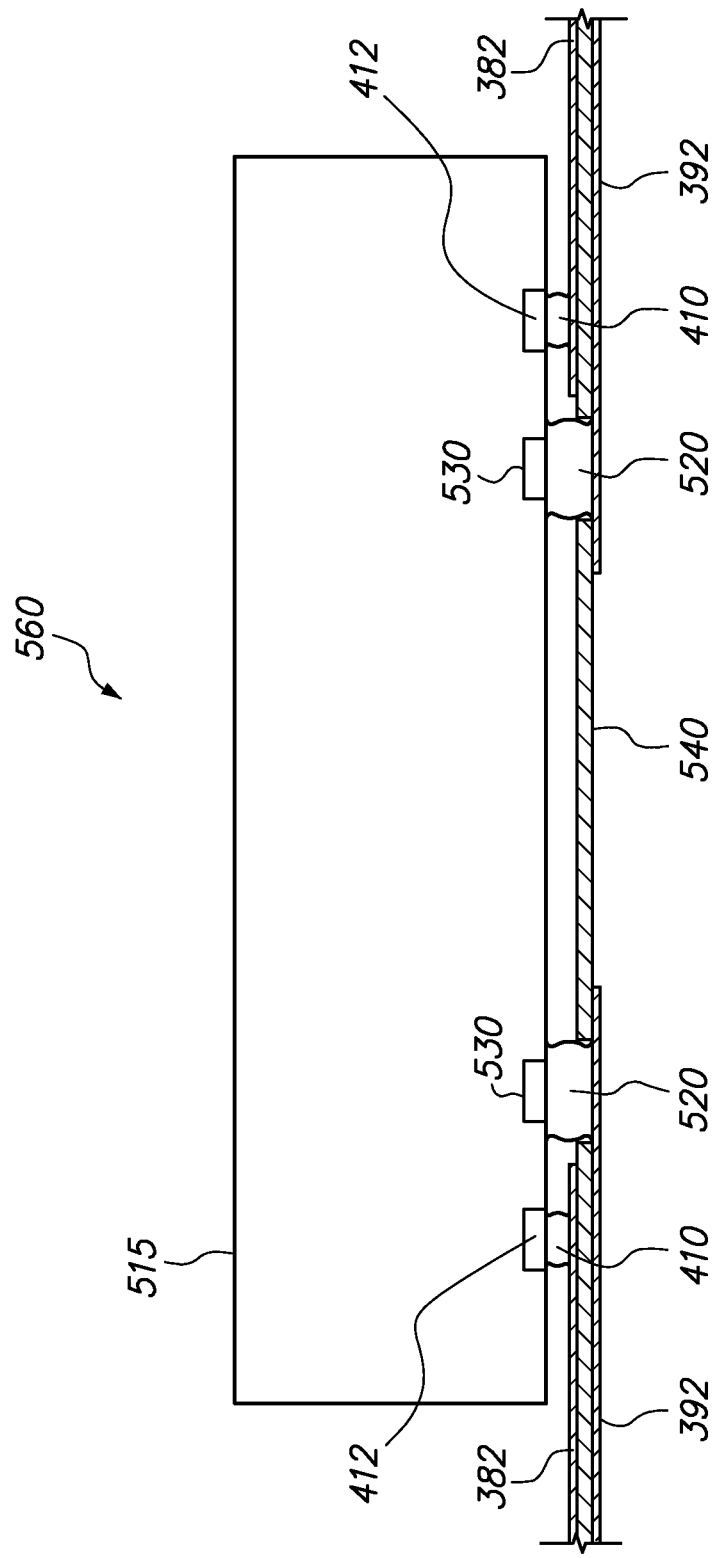
FIG. 5 is a side cross sectional view of a FPC according to another embodiment of the present invention.

FIG. 5 is a side cross sectional view of a laminar FPC 560 according to another embodiment of the present invention. In the embodiment of FIG. 5, an IC chip 515 includes a first plurality of terminals 412 and a second plurality of terminals 530. A first plurality of conductive bumps 410 contacts and connects a first plurality of conductive traces (e.g. trace 382) to the first plurality of terminals 412. A second plurality of conductive bumps 520 contacts and connects a second plurality of conductive traces (e.g. trace 392) to the second plurality of terminals 530. A dielectric layer 540 lies between and separates the first plurality of conductive traces (e.g. a first conductive layer including trace 382) and the second plurality of conductive traces (e.g. a second conductive layer including trace 392). The second plurality of conductive bumps 520 are aligned with and pass through a plurality of openings through the dielectric layer 540. The conductive bumps 410 and 520 may comprise tin solder, or may be gold balls, for example.

In the embodiment of FIG. 5, the second plurality of terminals 530 are not vertically offset towards or away from the second conductive layer (i.e. towards or away from trace 392) relative to the first plurality of terminals 412. Hence, an average height of the second plurality of conductive bumps 520 is shown (in FIG. 5) to be greater than that of the first plurality of conductive bumps 410, so that the second plurality of conductive bumps 520 can extend through openings in the dielectric layer 540 to the second conductive layer (e.g. trace 392). In certain embodiments such a bump height inequality may allow the FPC 560 to accommodate a greater number of electrical traces with connections to the mounted IC chip 515.

For example, in certain embodiments an average height of the second plurality of conductive bumps 520 may be in the range 20 to 50 microns greater than that of the first plurality of conductive bumps 410. In certain embodiments such a range may allow the FPC 560 to accommodate a greater number of electrical traces with connections to the mounted IC chip 515. In certain embodiments, an average height of the second plurality of conductive bumps 520 may be greater than that of the first plurality of conductive bumps 410 by a difference that is preferably approximately equal to the first conductive layer thickness (i.e. thickness of the trace 382) plus the thickness of the dielectric layer 540. In certain embodiments, that bump height difference may allow the FPC 560 to accommodate a greater number of electrical traces with connections to the mounted IC chip 515.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
    a disk drive base;
    a disk rotably mounted to the disk drive base;
    a head stack assembly (HSA) mounted to the disk drive base, the HSA including an actuator body, at least one actuator arm extending from the actuator body, and a laminar flexible printed circuit (FPC), the laminar FPC including
        a first conductive layer that includes a first plurality of conductive traces;
        a second conductive layer that includes a second plurality of conductive traces;
        a dielectric layer between the first conductive layer and the second conductive layer;
        an integrated circuit (IC) chip mounted to the laminar FPC, the IC chip including a first plurality of terminals and a second plurality of terminals, the first plurality of terminals being closer to the first conductive layer than to the second conductive layer, the second plurality of terminals being offset towards the second conductive layer relative to the first plurality of terminals;
        a first plurality of conductive bumps contacting and connecting the first plurality of conductive traces to the first plurality of terminals;
        a second plurality of conductive bumps contacting and connecting the second plurality of conductive traces to the second plurality of terminals, the second plurality of conductive bumps defining an average bump diameter, the second plurality of conductive bumps being aligned with and passing through a plurality of openings through the dielectric layer.

2. The disk drive of claim 1 wherein the plurality of openings through the dielectric layer define an average opening diameter, and the average opening diameter is greater than the average bump diameter.

3. The disk drive of claim 1 wherein the average opening diameter is in the range 80 microns to 150 microns.

4. The disk drive of claim 1 wherein the second plurality of conductive bumps comprises a tin solder material.

5. The disk drive of claim 1 wherein the second plurality of conductive bumps comprises a plurality of gold balls.

6. The disk drive of claim 1 wherein the first conductive layer defines a first conductive layer thickness, the dielectric layer defines a dielectric layer thickness, and the second plurality of terminals is offset towards the second conductive layer relative to the first plurality of terminals by an offset distance equal to the first conductive layer thickness plus the dielectric layer thickness.

7. The disk drive of claim 1 wherein the second plurality of terminals is offset towards the second conductive layer relative to the first plurality of terminals by an offset distance in the range 20 to 50 microns.

8. The disk drive of claim 1 wherein each of the first and second conductive layers comprises copper, and the laminar FPC further comprises a metallic stiffener that does not comprise copper.

9. The disk drive of claim 1 wherein the IC chip is a preamplifier chip.

10. The disk drive of claim 1 wherein the laminar FPC further comprises an insulative cover layer that is not the dielectric layer, the insulative cover layer being disposed over a portion of the first plurality of conductive traces.

11. A head stack assembly (HSA) comprising:
an actuator body;
at least one actuator arm extending from the actuator body; and
a laminar flexible printed circuit (FPC), the laminar FPC including
a first conductive layer that includes a first plurality of conductive traces;
a second conductive layer that includes a second plurality of conductive traces;
a dielectric layer between the first conductive layer and the second conductive layer;
an integrated circuit (IC) chip mounted to the laminar FPC, the IC chip including a first plurality of terminals and a second plurality of terminals, the first plurality of terminals being closer to the first conductive layer than to the second conductive layer, the second plurality of terminals being offset towards the second conductive layer relative to the first plurality of terminals;
a first plurality of conductive bumps contacting and connecting the first plurality of conductive traces to the first plurality of terminals;
a second plurality of conductive bumps contacting and connecting the second plurality of conductive traces to the second plurality of terminals, the second plurality of conductive bumps defining an average bump diameter, the second plurality of conductive bumps being aligned with and passing through a plurality of openings through the dielectric layer.

12. The HSA of claim 11 wherein the plurality of openings through the dielectric layer define an average opening diameter, and the average opening diameter is greater than the average bump diameter.

13. The HSA of claim 11 wherein the average opening diameter is in the range 80 microns to 150 microns.

14. The HSA of claim 11 wherein the second plurality of conductive bumps comprises a tin solder material.

15. The HSA of claim 11 wherein the second plurality of conductive bumps comprises a plurality of gold balls.

16. The HSA of claim 11 wherein the first conductive layer defines a first conductive layer thickness, the dielectric layer defines a dielectric layer thickness, and the second plurality of terminals is offset towards the second conductive layer relative to the first plurality of terminals by an offset distance equal to the first conductive layer thickness plus the dielectric layer thickness.

17. The HSA of claim 11 wherein the second plurality of terminals is offset towards the second conductive layer relative to the first plurality of terminals by an offset distance in the range 20 to 50 microns.

18. The HSA of claim 11 wherein each of the first and second conductive layers comprises copper, and the laminar FPC further comprises a metallic stiffener that does not comprise copper.

19. The HSA of claim 11 wherein the IC chip is a preamplifier chip.

20. The HSA of claim 11 wherein the laminar FPC further comprises an insulative cover layer that is not the dielectric layer, the insulative cover layer being disposed over a portion of the first plurality of conductive traces, the insulative cover layer including a large opening therethrough that is aligned with the IC chip.

21. A disk drive comprising:
a disk drive base;
a disk rotably mounted to the disk drive base;
a head stack assembly (HSA) mounted to the disk drive base, the HSA including an actuator body, at least one actuator arm extending from the actuator body, and a laminar flexible printed circuit (FPC), the laminar FPC including
a first conductive layer that includes a first plurality of conductive traces;
a second conductive layer that includes a second plurality of conductive traces;
a dielectric layer between the first conductive layer and the second conductive layer;
an integrated circuit (IC) chip mounted to the laminar FPC, the IC chip including a first plurality of terminals and a second plurality of terminals;
a first plurality of conductive bumps contacting and connecting the first plurality of conductive traces to the first plurality of terminals;
a second plurality of conductive bumps contacting and connecting the second plurality of conductive traces to the second plurality of terminals, an average height of the second plurality of conductive bumps being greater than that of the first plurality of conductive bumps, the second plurality of conductive bumps being aligned with and passing through a plurality of openings through the dielectric layer.

22. The disk drive of claim 21 wherein the average height of the second plurality of conductive bumps is in the range 20 to 50 microns greater than that of the first plurality of conductive bumps.

23. The disk drive of claim 21 wherein the first conductive layer defines a first conductive layer thickness, the dielectric layer defines a dielectric layer thickness, and the average height of the second plurality of conductive bumps is greater than that of the first plurality of conductive bumps by a difference that is approximately equal to the first conductive layer thickness plus the dielectric layer thickness.

24. The disk drive of claim 21 wherein the second plurality of conductive bumps comprises a tin solder material.

25. The disk drive of claim 21 wherein the second plurality of conductive bumps comprises a plurality of gold balls.

26. The disk drive of claim 21 wherein each of the first and second conductive layers comprises copper, and the laminar FPC further comprises a metallic stiffener that does not comprise copper.

27. The disk drive of claim 21 wherein the IC chip is a preamplifier chip.

28. The disk drive of claim 21 wherein the laminar FPC further comprises an insulative cover layer that is not the dielectric layer, the insulative cover layer being disposed over a portion of the first plurality of conductive traces.

* * * * *